United States Patent
Aso

(10) Patent No.: US 9,146,858 B2
(45) Date of Patent: Sep. 29, 2015

(54) CONTROL DEVICE, STORAGE DEVICE, AND STORAGE CONTROL METHOD

(71) Applicant: Sony Corporation, Tokyo (JP)

(72) Inventor: Shingo Aso, Tokyo (JP)

(73) Assignee: SONY CORPORATION, Tokyo (JP)

( * ) Notice: Subject to any disclaimer, the term of this patent is extended or adjusted under 35 U.S.C. 154(b) by 188 days.

(21) Appl. No.: 13/886,985

(22) Filed: May 3, 2013

(65) Prior Publication Data

US 2013/0304973 A1 Nov. 14, 2013

(30) Foreign Application Priority Data

May 11, 2012 (JP) ................................. 2012-109089

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01); *G06F 2212/7207* (2013.01)

(58) Field of Classification Search
None
See application file for complete search history.

(56) References Cited

U.S. PATENT DOCUMENTS

| 8,090,900 B2 * | 1/2012 | Cheng et al. | 711/103 |
| 2003/0093610 A1 * | 5/2003 | Lai et al. | 711/103 |
| 2009/0055578 A1 * | 2/2009 | Lee et al. | 711/103 |

FOREIGN PATENT DOCUMENTS

| JP | 2007-058840 | 3/2007 |
| JP | 2007-193838 | 8/2007 |
| JP | 2007-334852 | 12/2007 |
| JP | 2009-070098 | 4/2009 |

* cited by examiner

*Primary Examiner* — Brian Peugh
(74) *Attorney, Agent, or Firm* — Hazuki International, LLC

(57) ABSTRACT

A control device includes a control unit that performs control of writing of data with respect to a memory unit, in which a size of a physical block that is a deletion unit is larger than a size of a physical page that is a minimum writing unit, and generates logical and physical address management information that indicates a correspondence relation between a physical page address and a logical address in a writing target physical block, in which data is written through the control of writing, so as to perform control so that the logical and physical address management information is written in the writing target physical block.

7 Claims, 10 Drawing Sheets

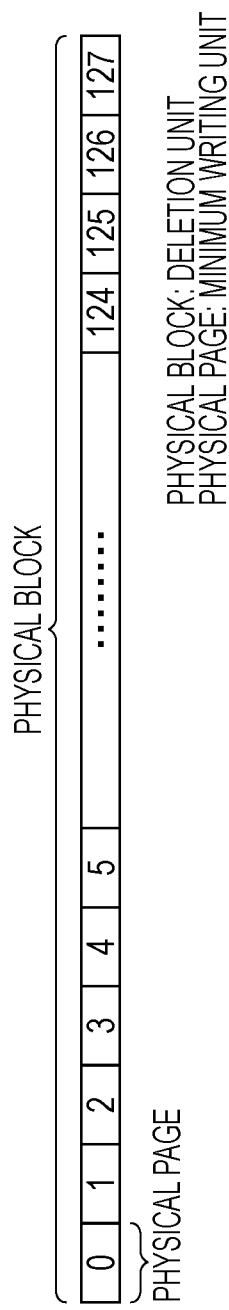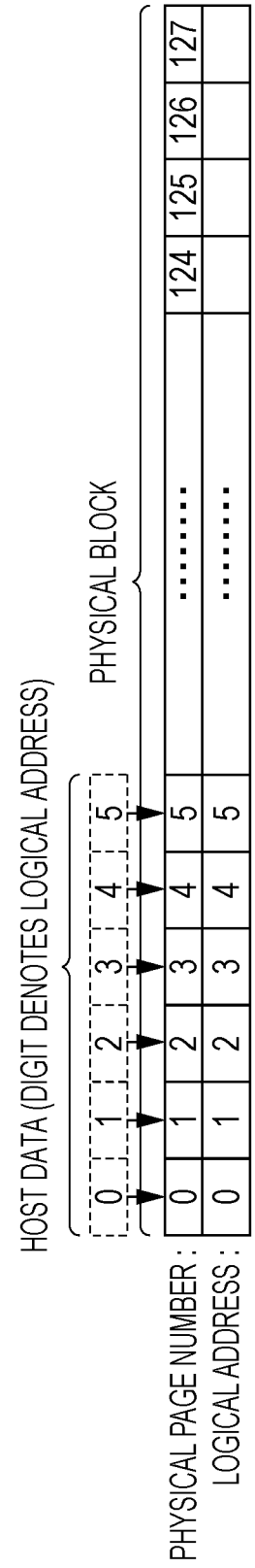

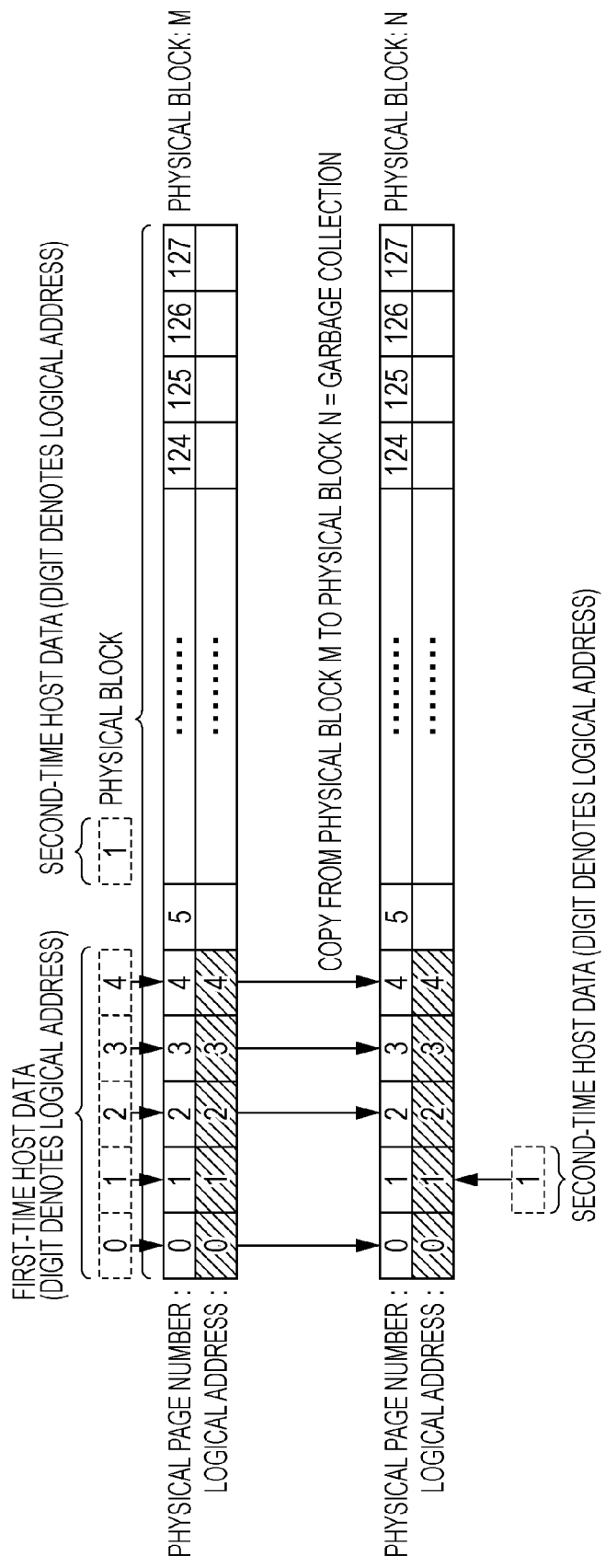

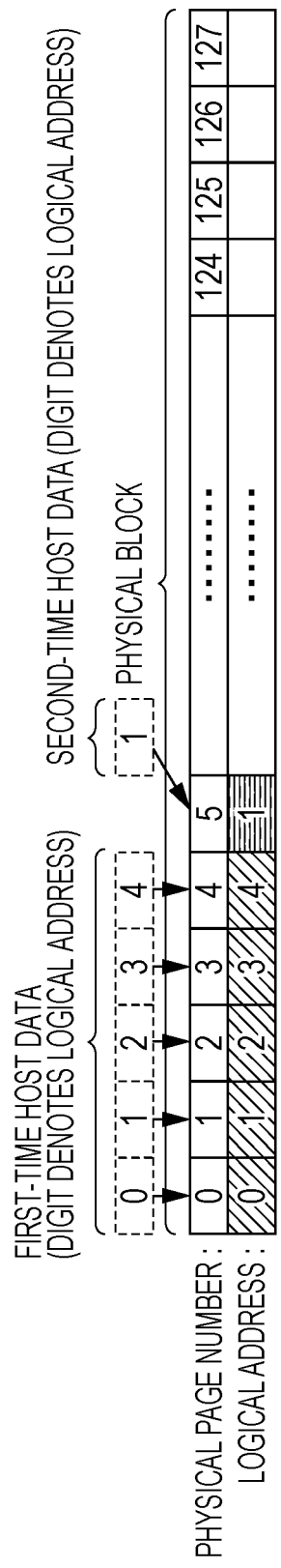

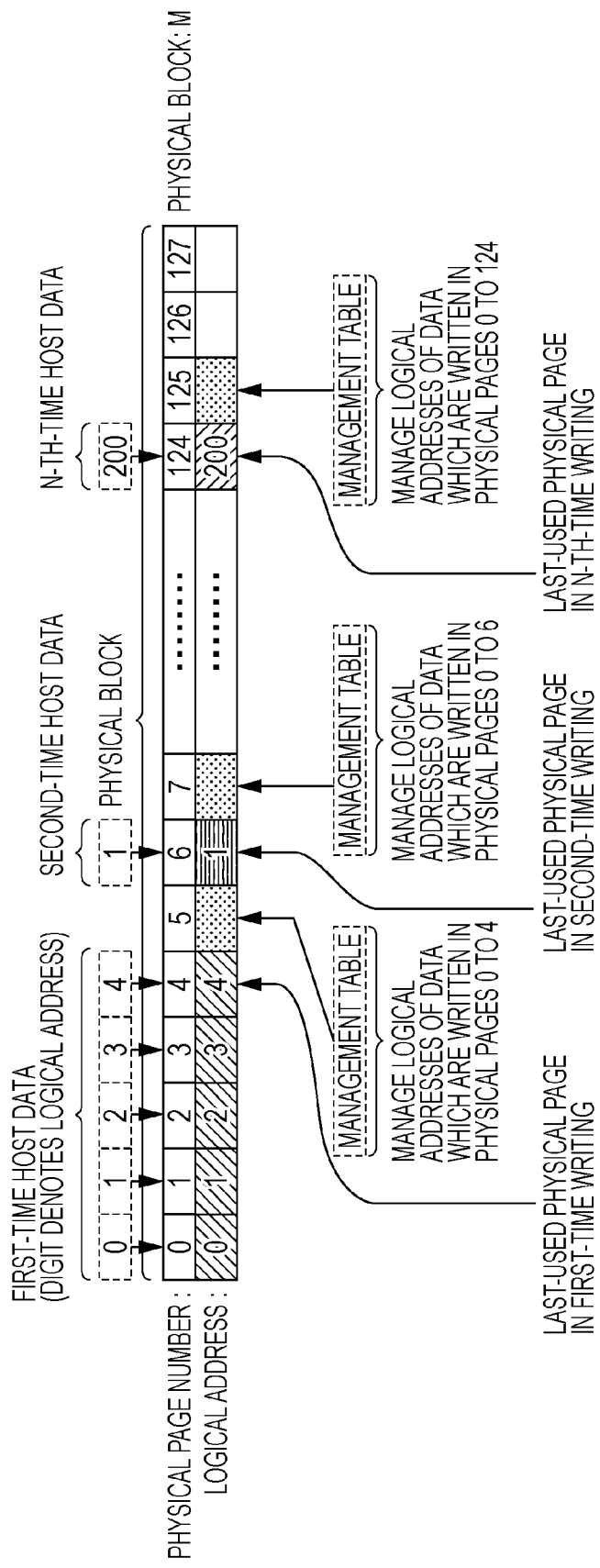

FIG. 7

| LOGICAL ADDRESS | PHYSICAL PAGE NUMBER |
|---|---|
| LOGICAL ADDRESS | PHYSICAL PAGE NUMBER |
| LOGICAL ADDRESS | PHYSICAL PAGE NUMBER |
| ⋮ | ⋮ |
| LOGICAL ADDRESS | PHYSICAL PAGE NUMBER |
| LOGICAL ADDRESS | PHYSICAL PAGE NUMBER |
| LOGICAL ADDRESS | PHYSICAL PAGE NUMBER |
| LOGICAL ADDRESS | PHYSICAL PAGE NUMBER |

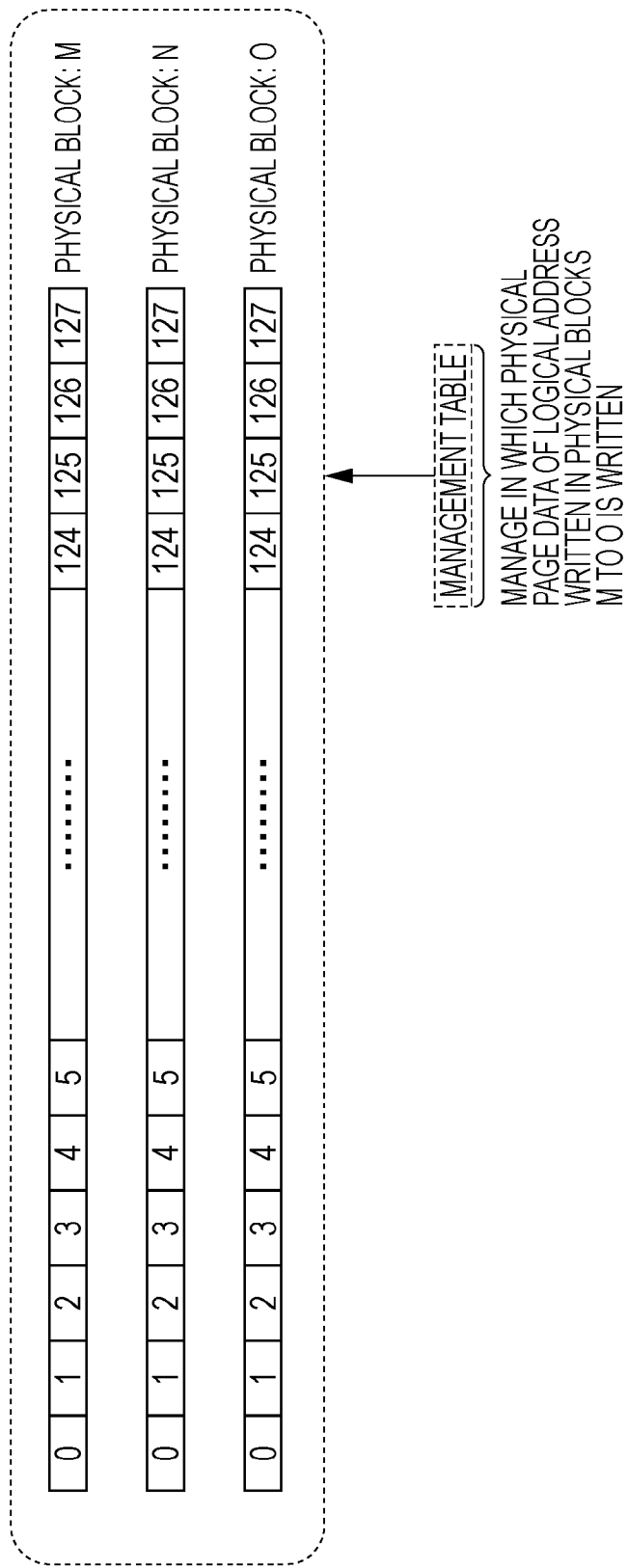

FIG. 11

| LOGICAL ADDRESS | PHYSICAL BLOCK ADDRESS | PHYSICAL PAGE NUMBER |
|---|---|---|
| LOGICAL ADDRESS | PHYSICAL BLOCK ADDRESS | PHYSICAL PAGE NUMBER |
| LOGICAL ADDRESS | PHYSICAL BLOCK ADDRESS | PHYSICAL PAGE NUMBER |
| ⋮ | ⋮ | ⋮ |
| ⋮ | ⋮ | ⋮ |
| LOGICAL ADDRESS | PHYSICAL BLOCK ADDRESS | PHYSICAL PAGE NUMBER |
| LOGICAL ADDRESS | PHYSICAL BLOCK ADDRESS | PHYSICAL PAGE NUMBER |
| LOGICAL ADDRESS | PHYSICAL BLOCK ADDRESS | PHYSICAL PAGE NUMBER |
| LOGICAL ADDRESS | PHYSICAL BLOCK ADDRESS | PHYSICAL PAGE NUMBER |

CONTROL DEVICE, STORAGE DEVICE, AND STORAGE CONTROL METHOD

CROSS REFERENCES TO RELATED APPLICATIONS

The present application claims priority to Japanese Priority Patent Application JP 2012-109089 filed in the Japan Patent Office on May 11, 2012, the entire content of which is hereby incorporated by reference.

BACKGROUND

The present application relates to a control device, a storage device, and a storage control method. Especially, the present application relates to processing of management information for conversion from logical addresses into physical addresses.

Storage devices employing a non-volatile memory such as a NAND type flash memory, for example, have been widespread. A non-volatile memory is used in a memory card, a solid state drive (SSD), an embedded multimedia card (eMMC), and the like which are used in various types of electronic devices and information processing devices, for example.

Japanese Unexamined Patent Application Publication Nos. 2009-70098, 2007-334852, 2007-193838, and 2007-58840 have disclosed storage devices employing a flash memory.

In a non-volatile memory, a physical address is used as an address of a physical storage region. Accordingly, a physical block, a physical page, and a physical sector are set. A plurality of physical sectors constitute a physical page, and a plurality of physical pages constitute a physical block.

Deletion (erasing) is performed in a physical block unit and writing (program) and reading are executable in a physical page unit.

A logical address is used for address designation from a host device side. A logical block and a logical page according to a logical address are associated with the above-described physical address. Accordingly, a logical address is converted into a physical address in response to an access request and access to an actual flash memory is executed.

SUMMARY

Thus, in a storage device in which a NAND type flash memory or the like is used for storage, a logical address which is designated from a host device has to be converted into a physical address which indicates on which physical page of which physical block on a flash memory the data corresponding to the logical address is located.

Accordingly, management information for performing such conversion has to be constructed.

In order to enable high-speed performance of such construction of management information, a method which restricts performance of writing of data so that logical addresses become invariably continuous in a physical block has been proposed. According to this method, a final-used physical page in a physical block is found out and a logical address of data which is recorded in the physical page is acquired, being able to construct management information at high speed.

However, logical addresses of data which is written in a physical block have to be invariably continuous in this method. In addition, there is such problem that garbage collection, in which another physical block is secured and data is copied on the already-secured physical block, occurs frequently, when a host device is to write data having discontinuous logical addresses or when the host device updates data having already-written logical addresses, significantly decreasing the life duration of a device and a writing speed.

On the other hand, a method which allows consecutive writing of data which has discontinuous logical addresses in a physical block has been disclosed as well.

According to this method, even when data having discontinuous logical addresses is written in, an occurrence of garbage collection described above can be avoided. However, data having discontinuous logical addresses are continued in a physical block, taking time for construction of management information. Specifically, construction of management information in this case is performed by acquiring logical addresses of all physical pages in a physical block which is an object, consequently taking much time to acquire management information and thus causing degradation in a writing/reading speed in this point.

It is desirable to avoid such state that consecutive writing of data having discontinuous logical addresses in a physical block is permitted and garbage collection frequently occurs and to improve a writing/reading speed by accelerating acquisition of management information of logical and physical addresses.

According to an embodiment of the present application, there is provided a control device configured as following.

Namely, a control device according to the embodiment of the present application includes a control unit that performs control of writing of data with respect to a memory unit, in which a size of a physical block that is a deletion unit is larger than a size of a physical page that is a minimum writing unit, and generates logical and physical address management information that indicates a correspondence relation between a physical page address and a logical address in a writing target physical block, in which data is written through the control of writing, so as to perform control so that the logical and physical address management information is written in the writing target physical block.

Further, a storage device is configured as following according to another embodiment of the present application.

Namely, a storage device according to the other embodiment of the present application includes a memory unit in which a size of a physical block that is a deletion unit is larger than a size of a physical page that is a minimum writing unit.

The storage device according to the other embodiment further includes a control unit that performs control of writing of data with respect to the memory unit, and generates logical and physical address management information that indicates a correspondence relation between a physical page address and a logical address in a writing target physical block, in which data is written through the control of writing, so as to perform control so that the logical and physical address management information is written in the writing target physical block.

As mentioned above, logical and physical address management information is generated to be stored in the memory unit, in the embodiments of the present application. Accordingly, such limitation that data is written so that logical addresses inevitably become continuous in a physical block does not have to be imposed, being able to avoid such state that consecutive writing of data having discontinuous logical addresses in a physical block is permitted and garbage collection frequently Occurs.

Further, logical and physical address management information is written in a writing target physical block in the embodiments of the present application. In a method of related art which permits consecutive writing of data having discontinuous logical addresses in a physical block, all physical pages which are managed by logical and physical address management information have been read out for acquisition of the logical and physical address management information. On the other hand, according to the embodiments of the present application, logical and physical address management information can be acquired by reading out a single physical page. Thus, acquisition of management information is accelerated, improving a writing/reading speed.

According to the embodiment of the present application, such state can be avoided that consecutive writing of data having discontinuous logical addresses in a physical block is permitted and garbage collection frequently occurs, and acquisition of management information of logical and physical addresses is accelerated to improve a writing/reading speed.

Additional features and advantages are described herein, and will be apparent from the following Detailed Description and the figures.

BRIEF DESCRIPTION OF THE FIGURES

FIG. 2 schematically illustrates a relation between a physical block and a physical page according to the embodiment;

FIG. 3 illustrates a method of related art in which data is written so that logical addresses inevitably become continuous in a physical block;

FIG. 4 illustrates a problem of the method of related art depicted in FIG. 3;

FIG. 5 illustrates a method of related art which permits consecutive writing of data which has discontinuous logical addresses in a physical block;

FIG. 6 illustrates a writing method according to the embodiment;

FIG. 7 illustrates the data configuration of a management table;

FIG. 10 schematically illustrates a concept of a management table which indicates a correspondence relation of logical and physical addresses of a plurality of physical blocks; and FIG. 11 illustrates the data configuration of a management table which indicates a correspondence relation of logical and physical addresses of a plurality of physical blocks.

DETAILED DESCRIPTION

An embodiment of the present application is described below.

The description is provided in the following order.
<1. Configuration of Storage Device>
<2. Writing Method of Related Art>
<3. Writing Method of Embodiment>
<4. Processing Procedure>
<5. Modification>
<1. Configuration of Storage Device>

Figure 1:
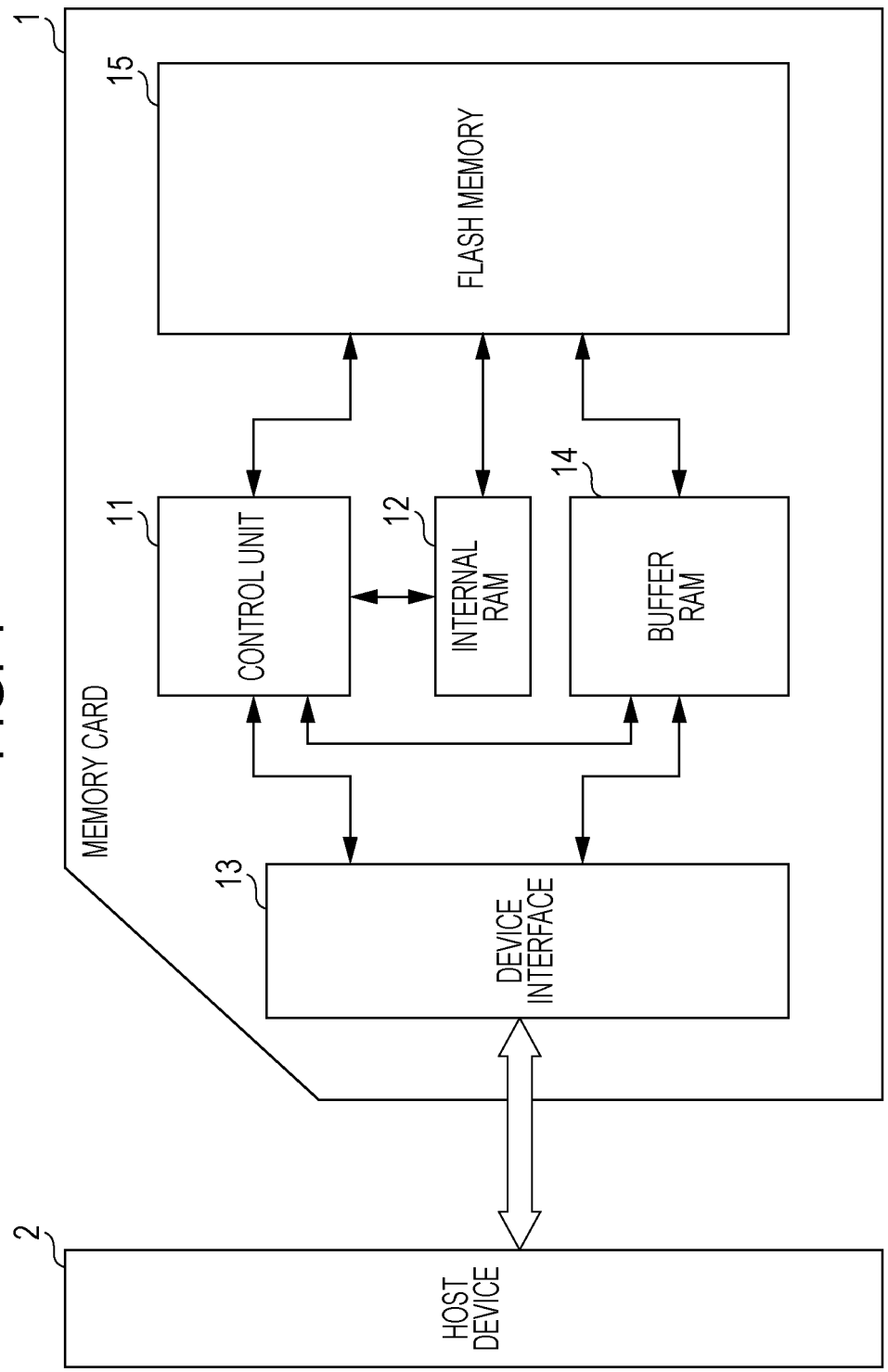
FIG. 1 is a block diagram illustrating the internal configuration of a storage device according to an embodiment.

A block diagram of FIG. 1 illustrates the internal configuration of a memory card 1 of a storage device according to an embodiment of the present application.

The memory card 1 is connected to a host device 2 and is used as a storage device. It is considered to use various types of electronic devices and information processing devices such as a personal computer, a digital still camera, a video camera, an audio player, a video player, a game console, a portable telephone, and an information terminal like a personal digital assistant (PDA), as the host device 2, for example.

The memory card 1 includes a control unit 11, an internal random access memory (RAM) 12, a device interface 13, a buffer RAM 14, and a flash memory 15.

The control unit 11 is composed of a central processing unit (CPU) and controls the whole of the memory card 1. Therefore, the control unit 11 sequentially executes command codes which are stored in the internal RAM 12. Mainly, the control unit 11 allows writing and reading of data to be executed in accordance with a command from the host device 2. Therefore, the control unit 11 performs data transmission/reception operation control of the device interface 13 with respect to the host device 2, control of a writing/reading operation of the buffer RAM 14, and control of an access operation to the flash memory 15.

The internal RAM 12 is composed of a static random access memory (SRAM), for example. The internal RAM 12 is used for storage of a program (firmware) executed by the control unit 11 and used as a work region.

The device interface 13 communicates with the host device 2.

The buffer RAM 14 is used for buffering of transfer data (writing data and reading data) with respect to the host device 2.

The flash memory 15 is a non-volatile memory and a NAND type flash memory is used as the flash memory 15 in this example.

As a basic operation of the memory card 1, a writing address (logical address), a data size, and data to be written are transmitted with a writing request from the host device 2 in data writing.

The data transmitted from the host device 2 is received at the device interface 13 and buffered in the buffer RAM 14. Then, the data is written in the flash memory 15 in the control of the control unit 11. The control unit 11 controls these operations depending on a writing request, a writing address, and a data size.

A reading address (logical address) and a data size are transmitted with a reading request from the host device 2 in data reading. The control unit 11 reads out data which is designated by the flash memory 15 on the basis of the reading address and the data size and buffers the data in the buffer RAM 14. Further, the control unit 11 performs error correction processing and the like with respect to the buffered read data. Then, the read data is forwarded from the buffer RAM 14 to the device interface 13 so as to be transmitted to the host device 2.

By the way, in the flash memory 15, a physical address is used as an address of a physical storage region. Accordingly, a physical block, a physical page, and a physical sector are set. A physical page is composed of a plurality of physical sectors and a physical block is composed of a plurality of physical pages.

FIG. 2 schematically illustrates a relation between a physical block and a physical page.

In the embodiment, it is assumed that a single physical block is composed of 128 pieces of physical pages.

Here, a physical page is divided into a plurality of physical sectors, though not illustrated.

Deletion (erasing) is performed in a physical block unit. Further, writing (program) and reading are executable in a physical page unit. That is, a physical block is a physical deletion unit (the minimum deletion unit) and a physical page is a physical writing unit (the minimum writing unit).

A logical address is used for address designation from the host device 2 side. A logical block, a logical page, and a logical sector according to a logical address are associated with the above-described physical address. That is, the control unit 11 generates logical and physical address management information in a manner to associate a logical address with a physical address. In response to an access request from the host device 2, the control unit 11 refers to the logical and physical address management information so as to convert a designated logical address into a physical address. Then, the control unit 11 executes actual access to the flash memory 15 by the physical address.

Hereinafter, data which is requested to be written and read by the host device 2 (data which is managed by a logical address by the host device 2) is referred to as "host data".

<2. Writing Method of Related Art>

As one of common writing methods of related art, a method in which data is written so that logical addresses become invariably continuous in a physical block as depicted in FIG. 3 can be cited.

FIG. 3 illustrates a case where an instruction for writing of data as host data is issued; the data corresponds to six pages, to which logical addresses 0 to 5 (logical addresses in page unit) are imparted.

A physical block is used from a physical page having physical page number=0 in sequence, so that the host data (logical addresses=0 to 5) of this case are written in continuous physical pages as FIG. 3.

In a case where such method that data is written so that logical addresses become invariably continuous as mentioned above is employed, when information of a host data written in a physical block is acquired in the next time, a recording state of the host data in the physical block can be grasped by finding out a final-used physical page in the physical block and reading a logical address of the host data which is written in a redundant area of the physical page. That is, a correspondence relation between a logical address and a physical address in the physical block can be grasped.

It is noted for confirmation that a final-used physical page represents a physical page to which latest data writing is performed in the past at the time. As described above, a physical block is used from a physical page having physical page number=0 in sequence. Therefore, in a state that continuity of logical addresses in a physical block is guaranteed, when a logical address of data which is recorded in a final-used physical page is turned out, a correspondence relation of logical and physical addresses in the physical block is figured out.

However, when the method illustrated in FIG. 3 is employed, a problem illustrated in FIG. 4 arises.

FIG. 4 illustrates a case where host data in the first writing is data having logical addresses 0 to 4 (data of five pages), and rewriting of data having logical address=1 is performed as the second writing.

In this case, it is assumed that writing of the host data (logical addresses=0 to 4) in the first writing is performed with respect to a physical block M.

In the second writing, continuity of logical addresses in the physical block has to be guaranteed. Therefore, it is difficult to write the data of logical address=1 which is to be newly written, in the physical block M. Further, a deletion unit is a physical block unit, so that it is also difficult to delete the data of logical address=1 which is recorded in the physical block M and newly write the data of logical address=1 which is designated in the second writing.

Accordingly, in this case, a physical block N which is different from the physical block M is newly secured and the data of logical addresses=0, 2, 3, 4 which are recorded in the physical block M and the data of logical address=1 of which an instruction for writing is issued on the second time are written in the physical block N which is secured as mentioned above so that the logical addresses become continuous.

In the method in which continuity of logical addresses is guaranteed as mentioned above, so-called garbage collection, in which host data is copied on another physical block N, occurs when host data having an already-written logical address is updated.

Though description with reference to the drawings is omitted, such garbage collection also occurs in a case where host data of discontinuous logical addresses are written in a physical block. That is, the method of related art which guarantees continuity of logical addresses causes frequent occurrences of garbage collection.

Frequent occurrences of garbage collection significantly degrade the life duration of a device and a writing speed.

On the other hand, a method which permits consecutive writing of host data having discontinuous logical addresses in a physical block has been disclosed as another writing method of related art.

In a case where this method is employed, as depicted in FIG. 5, when an instruction for rewriting of data having logical address=1 is issued in the second writing after writing of host data having logical addresses=0 to 4 as is the case with FIG. 4 described above, the host data having logical address=1 in the second writing can be written in a following part having physical page number=5.

Namely, as understood from this point, according to the method which permits discontinuity of logical addresses in a physical block, such state that garbage collection frequently occurs can be effectively avoided.

However, in the method of related art, management information is constructed by acquiring logical addresses of all physical pages in a target physical block. As a result, it takes much time to acquire management information and a writing/reading speed is decreased in this point.

In the embodiment of the present application, a state that consecutive writing of data having discontinuous logical addresses in a physical block is permitted and garbage collection frequently occurs is avoided, and acquisition of management information of logical and physical addresses is accelerated so as to improve a writing/reading speed.

<3. Writing Method of Embodiment>

It is first assumed that a correspondence relation of logical and physical addresses in a physical block is managed on the basis of logical and physical address management information so as to permit discontinuity of logical addresses in a physical block, in this embodiment. Specifically, a management table described later is employed.

Permission of discontinuity of logical addresses in a physical block can bring reduction in the number of times of an occurrence of the above-described garbage collection.

In the embodiment of the present application, on the assumption of management by the above-described logical and physical address management information, the logical and physical address management information can be effectively acquired in a short period of time and thus an access speed of writing/reading of host data is improved.

Specifically, in the embodiment, such method is employed that logical and physical address management information is written in a physical block in which host data is also written, in response to an execution of writing of the host data.

Here, logical and physical address management information is referred to below as a management table, as well.

FIG. 6 illustrates a writing method of the embodiment.

FIG. 6 illustrates a case where an instruction for writing of data having logical addresses=0 to 4 as host data on the first time is issued, an instruction for rewriting of data having logical address=1 as host data on the second time is issued, and then an instruction for writing of data having logical address=200 as host data on the n-th time is issued, with respect to a certain physical block which is a writing object (assumed to be an unrecorded physical block).

In response to the instruction for writing of the host data on the first time, the designated data having logical addresses=0 to 4 are first written in physical pages having physical page numbers 0 to 4 in the physical block.

As described above, the physical block is used from a physical page having physical page number=0 in sequence.

Then, a management table indicating a correspondence relation of logical and physical addresses on these written data is generated and the management table is written in a physical block in which host data has been written. Specifically, in this example, a management table is written in the physical page next to a last-used physical page in the physical block in which host data has been written. That is, in a case of the example of FIG. 6, a management table is written in a physical page having physical page number=5 which is the physical page next to a physical page having physical page number=4 which is a last-used physical page at a time point of the execution of writing of the management table.

Writing of a management table is performed in a similar manner also in following writing of host data.

Specifically, in response to an instruction for writing of host data on the second time (rewriting of data of logical address=1), a management table indicating a correspondence relation of logical and physical addresses in physical pages having physical page numbers=0 to 6 is generated after host data having logical address=1 of which an instruction for writing is issued as FIG. 6 is written in a physical page having physical page number=6, and the management table which is generated is written in the physical page next to a last-used physical page, that is, written in a physical page having physical page number=7 in this case.

FIG. 6 illustrates a case where physical pages having physical page numbers=7 to 123 are subsequently used and then, an instruction for writing of host data on the n-th time (data of logical address=200) is issued. In the n-th time writing, after the designated data of the logical address=200 is written in a physical page having physical page number=124, a management table indicating a correspondence relation of logical and physical addresses in physical pages having physical page numbers=0 to 124 is generated and the management table which is generated is written in the physical page next to a last-used physical page, that is, written in a physical page having physical page number=125 in this case.

FIG. 7 illustrates the data configuration of a management table.

As depicted in FIG. 7, a management table is information which associates a logical address with a physical page number.

In this example, one management table is information for managing a correspondence relation of logical and physical addresses in a single physical block. A logical address in this example is a logical address which is provided to host data which is written in a physical page in a target physical block. In a management table, each logical address is associated with information of a physical page number of a physical page in which host data provided with the logical address is written.

In the embodiment, a management table is written in a physical block in the flash memory 15 as described above. Therefore, when management information of logical and physical addresses is later acquired for performing reading/writing of the corresponding physical block, the information contained in a last-used physical page in the physical block may be read out. Consequently, logical and physical address management information can be acquired faster than a case of a method of related art.

Specifically, in the method of related art which permits discontinuity of logical addresses in a physical block, it is necessary to read out all physical pages in a target physical block for acquisition of logical and physical address management information. However, according to the embodiment, acquisition of logical and physical address management information is realized by reading out a single physical page (a last-used physical page in the case of this example) in a target physical block, enabling faster acquisition of management information.

As a result, a reading/writing speed is improved compared to related art.

Further, as understood from the description of FIG. 6, writing of a management table is executed for every writing of host data, in this example. Accordingly, past logical and physical address management information is also stored in a corresponding physical block. Therefore, when it is difficult to read out the latest management table in the physical block due to a certain reason, restoration of the logical and physical address management information can be efficiently performed by using stored past management tables.

Here, in later-described processing illustrated in FIG. 8, restoration of management information is efficiently performed by using information of a management table which has been written in the past.

It is noted that the control unit 11 generates a management table on the internal RAM 12.

As described above, the control unit 11 grasps a logical address of data which is to be written in accordance with a command from the host device 2 side.

The control unit 11 accumulates information in which a logical address of host data of which an instruction for writing is issued is associated with a physical page number of a physical page in which the host data is to be written, on the internal RAM 12 as entry information of a management table. Thus, a management table is generated. A management table which is thus generated is written in the physical page next to a last-used physical page in a physical block in which host data has been written.

<4. Processing Procedure>

A procedure of specific processing which is to be executed for realizing the above-described writing method of the embodiment is described with reference to flowcharts of FIG. 8 and FIG. 9.

Figure 8:
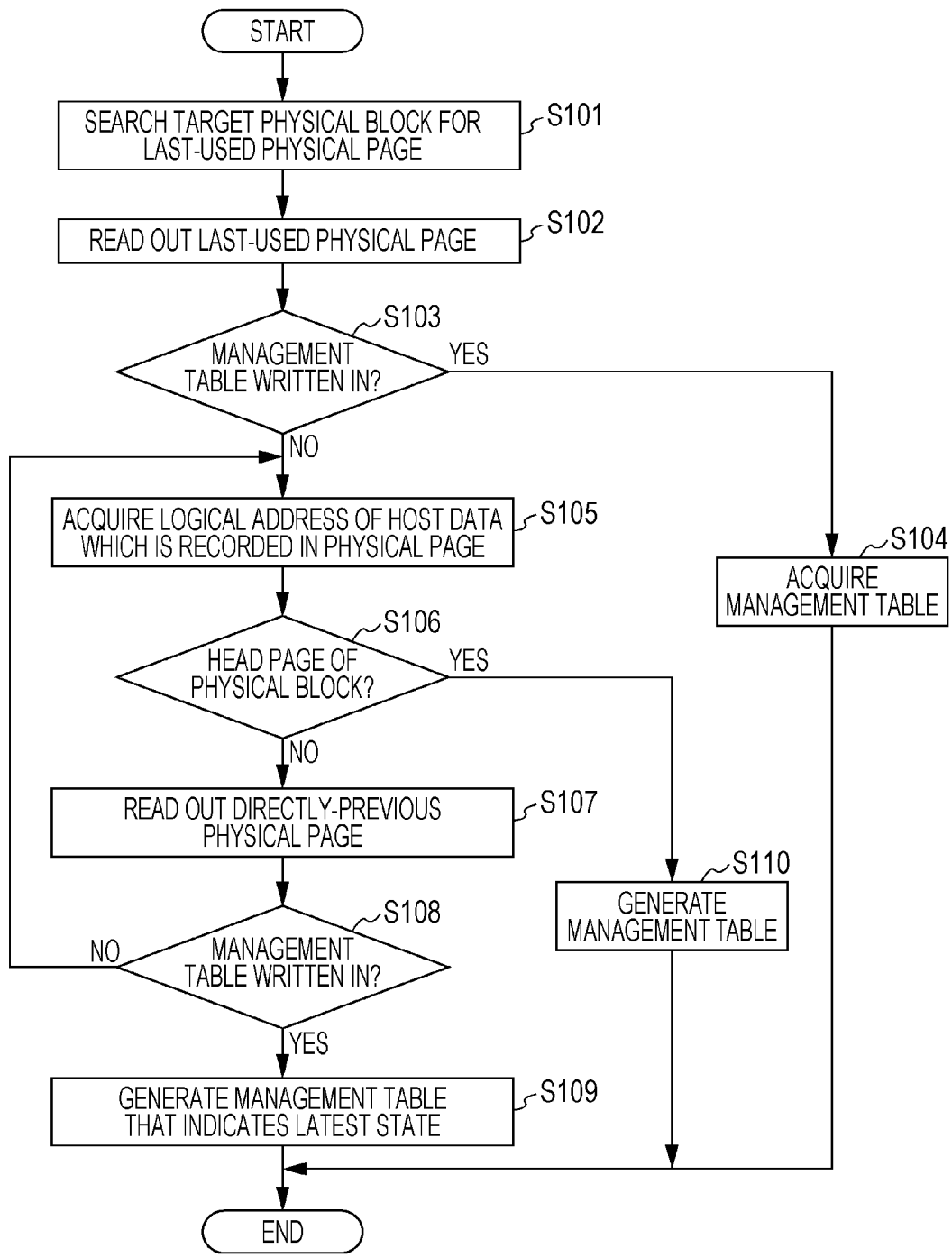
FIG. 8 is a flowchart of management table construction processing according to the embodiment.
Figure 9:
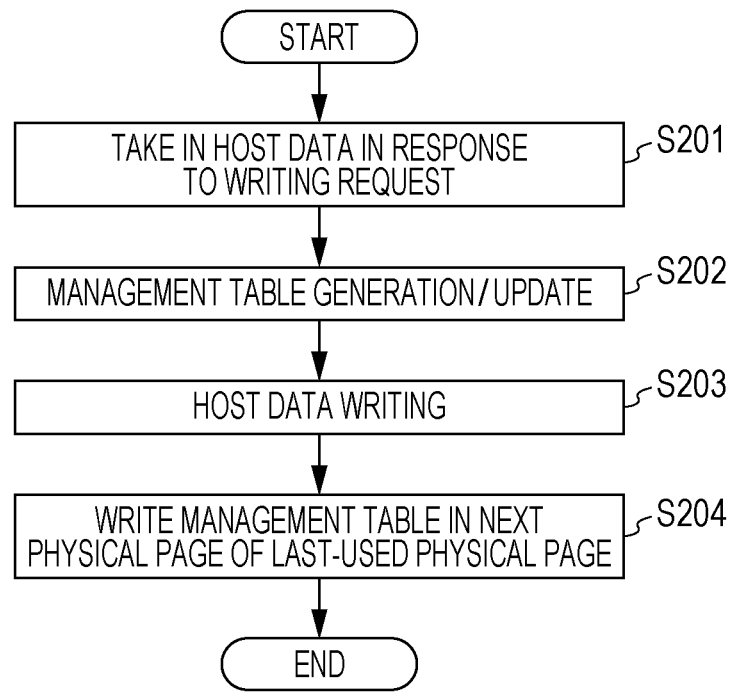
FIG. 9 is a flowchart of processing in data writing according to the embodiment.

The processing illustrated in FIGS. 8 and 9 is executed by the control unit 11 in accordance with a program which is stored in a predetermined storage device such as the flash memory 15.

FIG. 8 illustrates construction processing of a management table.

The construction processing of a management table illustrated in FIG. 8 may be executed at least in start-up.

In FIG. 8, the control unit 11 searches a target physical block for a last-used physical page in step S101. For example, binary search can be used to search for a last-used physical page. As described above, a last-used physical page represents a physical page in which the latest data has been written in the past at the time.

The above-mentioned binary search is a method for searching for a last-used physical page while confirming a central physical page, for example. In a case where a physical block is composed of eight physical pages (0 to 7), for example, a physical page positioned on the center, for example, a physical page having physical page number=4 is first confirmed. When the physical page having physical page number=4 is a written physical page, it is understood that a last-used physical page is present in a physical page after the physical page having physical page number=4. Therefore, a physical page of physical page number=6 which is positioned on the center of a range of physical page numbers=5 to 7 is confirmed. When the physical page having physical page number=6 is a written physical page, a physical page having physical page number=7 can be specified as a last-used physical page. Thus, physical pages are narrowed down so as to search for a last-used physical page while confirming a central physical page.

When finding out a last-used physical page, the control unit 11 executes reading of the last-used physical page in step S102.

Then, the control unit 11 determines whether or not a management table has been written in the last-used physical page, in the following step S103.

When a positive result in which a management table has been written in the last-used physical page is obtained in step S103, the control unit 11 goes to step S104 to take in the management table. That is, when the management table is written in the last-used physical page, the management table contains information indicating the latest status of a correspondence relation of logical and physical addresses in the target physical block (in other words, information indicating a correspondence relation of logical and physical addresses of all pieces of host data which has been written in the corresponding physical block at the time), and therefore the management table is maintained in the internal RAM 12 as is.

On the other hand, when a negative result in which a management table has not been written in the last-used physical page is obtained in step S103, the latest management table is not present in the physical block. As a conceivable case, a case where writing of a management table is not performed due to a certain reason, a case where it is difficult to read out a management table due to data corruption or the like even though writing is performed, and the like are cited.

In a case where it is determined that a management table has not been written in the last-used physical page, the control unit 11 executes the following processing of steps S105 to S110 so as to restore the latest management table.

Specifically, when the negative result is obtained in step S103, the control unit 11 goes to step S105 to acquire a logical address of host data which is recorded in a physical page. That is, the control unit 11 acquires a logical address of host data which is recorded in the physical page which is read out in the preceding step S102 or the following step S107.

After acquiring the logical address as this, the control unit 11 determines whether or not the corresponding physical page is a head physical page of the target physical block, in step S106.

When a negative result in which the corresponding physical page is not the head physical page of the physical block is obtained in step S106, the control unit 11 goes to step S107 to read out a directly-previous physical page and determines whether or not a management table has been written in the directly-previous physical page, in step S108.

When a negative result in which a management table has not been written is obtained in step S108, processing from step S105 to step S108 is repeated. Accordingly, acquisition of logical addresses is performed back through physical pages in sequence until a management table is found out. In other words, such processing is executed that a physical page in which a management table is stored is found out while storing logical addresses of host data of respective physical pages in a manner to pursue the preceding physical pages in sequence from the last-used physical page.

When a positive result in which a management table has been written is obtained in step S108, the control unit 11 goes to step S109 to generate a management table indicating the latest state. That is, the control unit 11 generates a management table containing the latest information by adding correspondence relation information of logical and physical addresses which is generated on the basis of logical addresses acquired in processing of steps S105 to S108 (from the last-used physical page to the physical page directly following the physical page in which the management table is found out) to the information contained in the management table which is found out in step S108 (correspondence relation information of logical and physical addresses of the physical page directly preceding the physical page in which the management table is found out to a physical page having physical page number=0). In other words, this is processing of updating a management table which has been written in the past to the latest state.

As described above, a management table is generated in the internal RAM 12 and accordingly, a management table which is thus updated to the latest state is also stored in the internal RAM 12.

Here, a case where the positive result in which the physical page is the head page of the physical block is obtained in step S106 represents that a management table is not found in the corresponding physical block.

Therefore, in this case, the control unit 11 goes to step S110 to generate a management table. Specifically, the control unit 11 sequentially associates information of a logical address which is acquired in the processing of step S105 with a physical page number of a physical page from which the logical address is acquired, so as to generate a management table indicating a correspondence relation of logical and physical addresses of a last-used physical page to a physical page having physical page number=0.

If the construction processing illustrated in FIG. 8 is executed at least in start-up, a state that the control unit 11 grasps the latest correspondence relation of logical and physical addresses of each physical block in the flash memory 15 can be obtained at a time point that a writing/reading instruction is issued from the host device 2.

FIG. 9 illustrates processing which is to be executed in response to writing of host data.

In FIG. 9, the control unit 11 takes in host data which is written in accordance with a writing request from the host device 2 and acquires a logical address, for example, in step S201.

Specifically, the control unit 11 temporarily stores transmitted host data in the buffer RAM 14 via the device interface 13. Further, the control unit 11 grasps a logical address of host data which is to be written and the data amount in accordance with a command of a writing request which is transmitted via the device interface 13.

In step S202, a management table is generated or updated so as to respond to data writing of this time.

Due to the execution of the construction processing illustrated in FIG. 8 above, the control unit 11 is in a state that the control unit 11 has grasped a correspondence relation of logical and physical addresses in a physical block which is a writing target, at present time (time point before writing of host data).

When writing of host data has been executed with respect to the target physical block in the past, the processing of step S202 becomes to be processing for updating a management table which has been already stored in the internal RAM 12, on the basis of correspondence relation information of logical and physical addresses of host data which is to be written in from now. Alternatively, when the target physical block is used for the first time, the processing of step S202 becomes to be processing for newly generating a management table on the basis of correspondence relation information of logical and physical addresses of host data which is to be written in from now.

After executing the generating/updating processing of a management table in step S202, the control unit 11 executes writing of host data in step S203.

As described above, a physical block is used from physical page number=0 in sequence, so that the control unit 11 sequentially writes host data, which is designated from the host device 2 side, from a physical page which is the physical page next to a last-used physical page of the target physical block.

After executing the writing of host data, the control unit 11 executes writing of the management table with respect to the physical page next to the last-used physical page in step S204. That is, the control unit 11 writes the management table which is generated/updated in the internal RAM 12 in the preceding step S202 in the physical page next to the last-used physical page of the physical block in which host data has been written in step S203.

Here, writing of a management table is executed for every writing of host data in FIG. 9. However, timing of an execution of writing of a management table is not necessarily limited to every writing of host data.

For example, various methods such as a method in which writing of a management table is performed when writing of host data is performed predetermined times or more since previous writing of a management table and a method in which writing of a management table is performed when logical addresses are discontinuous in a physical block may be employed.

Further, it is conceivable that construction processing of a management table illustrated in FIG. 8 (generating/updating processing of a management table in a RAM) is not limitedly performed at start-up but performed for every request of writing or reading from the host device 2, for example.

<5. Modification>

The embodiment according to the present application has been described thus far, but embodiments of the present application are not limited to the above-described specific examples.

A management table is information indicating a correspondence relation of logical and physical addresses of a single physical block in the above description, but a management table may be information indicating a correspondence relation of logical and physical addresses of a plurality of physical blocks, for example.

FIG. 10 schematically illustrates a concept of a management table in such case.

FIG. 10 illustrates an example of a management table indicating a correspondence relation of logical and physical addresses of three physical blocks which are physical blocks M, N, and O.

In this case, the three physical blocks are integrally managed, and a management table is written in a predetermined physical page in these three physical blocks. For example, a management table in this case is written in the physical page next to a last-used physical page in these three physical blocks. By employing a method for thus searching for a last-used physical page for acquisition of a management table as above-described FIG. 8, whether or not a management table is the latest management table can be easily recognized.

FIG. 11 illustrates the data configuration of a management table which indicates a correspondence relation of logical and physical addresses of a plurality of physical blocks.

In a case where a management table indicates a correspondence relation of logical and physical addresses of a plurality of physical blocks, the management table associates a logical address, the number of a physical page (physical page number) in which data provided with the logical address is written, and an address of a physical block (physical block address) in which the data provided with the logical address is written.

When a correspondence relation of logical and physical addresses of a plurality of physical blocks is managed by a single management table, the data size of the management table tends to be large. Depending on a system environment, a management table which manages a correspondence relation of a single physical block or a management table which manages a correspondence relation of a plurality of physical blocks can be selected.

When a management table which manages a correspondence relation of logical and physical addresses of a plurality of physical blocks is employed as mentioned above, logical and physical address management information can be acquired by reading a single management table, though logical and physical address management information has been acquired by reading all written physical pages in a plurality of physical blocks in related art. As a result, a reading/writing speed can be further improved.

Further, an example in which the embodiment of the present application is applied to a storage device including a NAND type flash memory has been illustrated above. However, embodiments of the present application may be favorably applied to a case where data is written in a memory unit in which the size of a physical block which is a deletion unit is larger than the size of a physical page which is the minimum writing unit.

Embodiments of the present application may employ the following configurations.

(1) A control device includes a control unit that performs control of writing of data with respect to a memory unit, in which a size of a physical block that is a deletion unit is larger than a size of a physical page that is a minimum writing unit, and generates logical and physical address management information that indicates a correspondence relation between a physical page address and a logical address in a writing target physical block, in which data is written through the control of writing, so as to perform control so that the logical and physical address management information is written in the writing target physical block.

(2) In the control device according to (1), the control unit performs control so that the logical and physical address management information is written in the physical page next to a last-used physical page in the writing target physical block.

(3) In the control device according to (2), the control unit performs processing of searching for physical pages, in which the logical and physical address management information is written, in sequence from a last-used physical page to a physical page on a head side so as to acquire the logical and physical address management information that is first found out, in the target physical block, and performs processing of updating the logical and physical address management information by using the logical and physical address management information that is acquired and a logical address of a physical page in which no logical and physical address management information has been written.

(4) In the control device according to any one of (1) to (3), the control unit generates information that indicates a correspondence relation between the physical page address and the logical address of a single physical block, as the logical and physical address management information.

(5) In the control device according to any one of (1) to (3), the control unit generates information that indicates a correspondence relation between the physical page address and the logical address of a plurality of physical blocks, as the logical and physical address management information.

(6) In the control device according to any one of (1) to (5), the control unit performs writing control with respect to the memory unit that is a NAND type flash memory.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control device, comprising:
   a control unit that performs control of writing of data with respect to a memory unit, in which a size of a physical block that is a deletion unit is larger than a size of a physical page that is a minimum writing unit, and generates logical and physical address management information that indicates a correspondence relation between a physical page address and a logical address in a writing target physical block in which data is written through the control of writing, wherein the logical and physical address management information is written in the writing target physical block,
   wherein the control unit performs control so that the logical and physical address management information is written in a physical page next to a last-used physical page in the writing target physical block.

2. The control device according to claim 1, wherein the control unit
   performs processing of searching for physical pages in which the logical and physical address management information is written, in sequence from the last-used physical page to a physical page on a head side so as to acquire the logical and physical address management information that is first found out in the writing target physical block, and
   performs processing of updating the logical and physical address management information by using the logical and physical address management information that is acquired and a logical address of a physical page in which no logical and physical address management information has been written.

3. The control device according to claim 1, wherein the control unit generates information that indicates a correspondence relation between the physical page address and the logical address for every single physical block, as the logical and physical address management information.

4. The control device according to claim 1, wherein the control unit generates information that indicates a correspondence relation between the physical page address and the logical address for a plurality of physical blocks, as the logical and physical address management information.

5. The control device according to claim 1, wherein the control unit performs writing control with respect to the memory unit that is a NAND type flash memory.

6. A storage device, comprising:
   a memory unit in which a size of a physical block that is a deletion unit is larger than a size of a physical page that is a minimum writing unit; and
   a control unit that performs control of writing of data with respect to the memory unit, and generates logical and physical address management information that indicates a correspondence relation between a physical page address and a logical address in a writing target physical block in which data is written through the control of writing, wherein the logical and physical address management information is written in the writing target physical block,
   wherein the control unit performs control so that the logical and physical address management information is written in a physical page next to a last-used physical page in the writing target physical block.

7. A storage control method, comprising:
   performing control of writing of data with respect to a memory unit in which a size of a physical block that is a deletion unit is larger than a size of a physical page that is a minimum writing unit, and generating logical and physical address management information that indicates a correspondence relation between a physical page address and a logical address in a writing target physical block in which data is written through the control of writing, wherein the logical and physical address management information is written in the writing target physical block,
   wherein the control is performed so that the logical and physical address management information is written in a physical page next to a last-used physical page in the writing target physical block.

* * * * *